(12) United States Patent
Koshinz et al.

(10) Patent No.: US 11,079,554 B1
(45) Date of Patent: Aug. 3, 2021

(54) PROCESS FOR POLISHING END FACE OF GIGABIT PLASTIC OPTICAL FIBER

(71) Applicant: The Boeing Company, Chicago, IL (US)

(72) Inventors: Dennis G. Koshinz, Bellevue, WA (US); Eric Y. Chan, Mercer Island, WA (US); Kim Quan Anh Nguyen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 16/801,981

(22) Filed: Feb. 26, 2020

(51) Int. Cl.
*G02B 6/38* (2006.01)
*G02B 6/25* (2006.01)

(52) U.S. Cl.
CPC ............ *G02B 6/3863* (2013.01); *G02B 6/25* (2013.01); *G02B 6/3854* (2013.01)

(58) Field of Classification Search
None
See application file for complete search history.

(56) References Cited

U.S. PATENT DOCUMENTS

| | | | |
|---|---|---|---|
| 4,148,554 A | 4/1979 | Magnusson et al. | |
| 4,272,926 A * | 6/1981 | Tamulevich | .......... B24B 19/226 29/525 |
| 4,695,124 A * | 9/1987 | Himono | ............... G02B 6/3857 385/78 |
| 5,778,125 A | 7/1998 | Busse et al. | |
| 5,855,503 A | 1/1999 | Csipkes et al. | |
| 5,923,805 A | 7/1999 | Anderson et al. | |
| 6,466,310 B2 * | 10/2002 | Nguyen | .................... B08B 1/00 356/73.1 |
| 6,565,423 B1 | 5/2003 | Matsunaga et al. | |
| 7,001,080 B2 * | 2/2006 | Minami | ................ B24B 19/226 385/85 |
| 8,128,459 B2 | 3/2012 | Ling | |
| 8,708,776 B1 | 4/2014 | Frazer | |
| 9,645,328 B2 * | 5/2017 | Cabessa | ............... G02B 6/3885 |
| 9,989,709 B2 | 6/2018 | Koshinz et al. | |
| 10,012,793 B2 | 7/2018 | Chan et al. | |
| 2003/0128962 A1 * | 7/2003 | Sommer | ............... B24B 41/067 385/147 |
| 2005/0226584 A1 * | 10/2005 | Williams | ................ G01L 5/105 385/130 |

(Continued)

OTHER PUBLICATIONS

Extended European Search Report dated Oct. 25, 2017 in European Patent Application No. 17170991.8.

*Primary Examiner* — Michelle R Connelly

(74) *Attorney, Agent, or Firm* — Ostrager Chong Flaherty & Broitman P.C.

(57) ABSTRACT

A process for polishing the end face of a gigabit plastic optical fiber (GbPOF) to produce a mirror smooth surface without any defect. Smooth GbPOF end faces reduce the optical coupling loss when two plastic optical fibers are connected. The polishing process can be used to produce GbPOF end faces which are free of defects such as scratches. The polishing process involves the use of successive abrasive films having decreasing surface roughness to abrade the end of a GbPOF. More specifically, each subsequently applied abrasive film has a mean particle size which is less than the mean particle size of the previously applied abrasive film.

20 Claims, 8 Drawing Sheets

(56) References Cited

U.S. PATENT DOCUMENTS

| | | | |
|---|---|---|---|
| 2006/0018605 A1* | 1/2006 | Luther | G02B 6/3863 |
| | | | 385/85 |
| 2013/0114798 A1* | 5/2013 | Hintenlang | A61B 6/00 |
| | | | 378/205 |
| 2013/0163930 A1 | 6/2013 | Jian | |
| 2016/0031749 A1* | 2/2016 | Bhagavatula | H01J 37/32568 |
| | | | 216/24 |
| 2016/0340241 A1* | 11/2016 | Akarapu | G02B 6/3837 |
| 2017/0248761 A1* | 8/2017 | Jian | G02B 6/3846 |
| 2017/0336574 A1* | 11/2017 | Koshinz | B24B 19/226 |
| 2018/0224242 A1* | 8/2018 | Bellah | F41G 1/38 |
| 2018/0335580 A1* | 11/2018 | Lohse | G02B 6/3885 |
| 2018/0341068 A1* | 11/2018 | Igawa | B24B 49/12 |
| 2020/0264365 A1* | 8/2020 | Koike | G02B 6/028 |
| 2020/0278500 A1* | 9/2020 | Christie | G02B 6/3863 |

\* cited by examiner

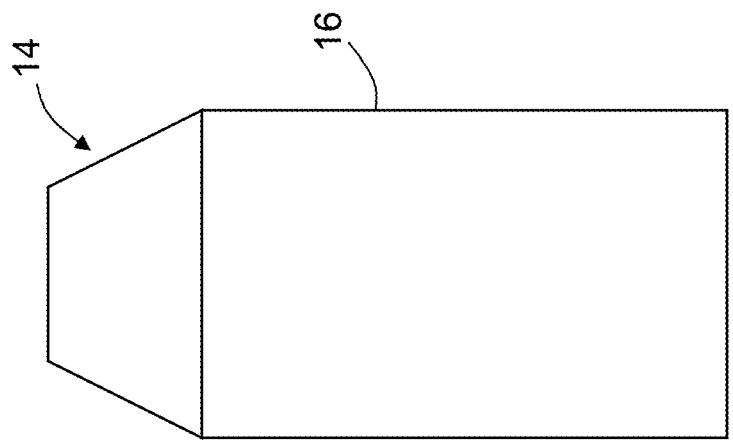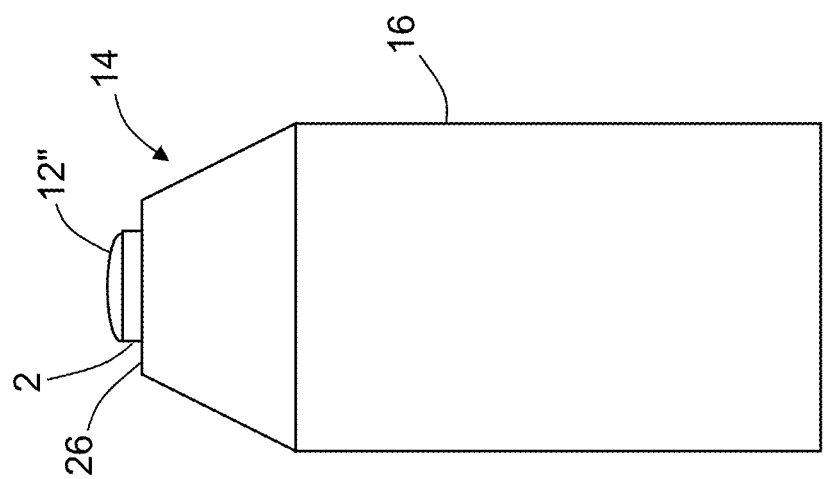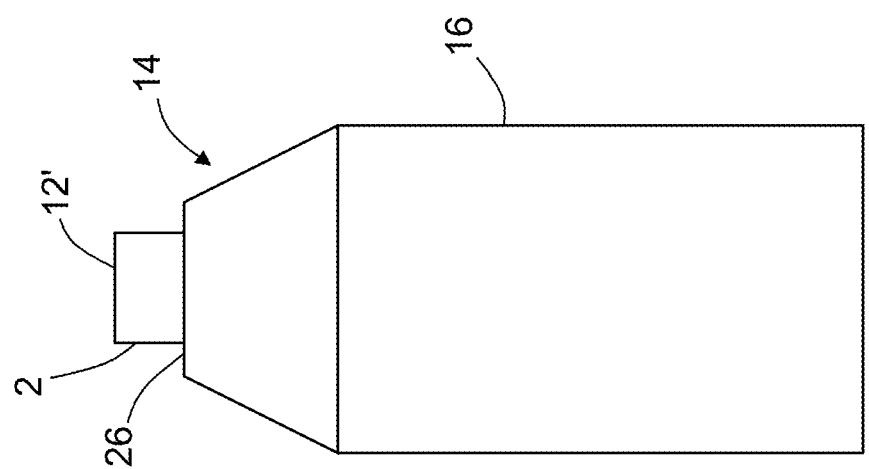

PROCESS FOR POLISHING END FACE OF GIGABIT PLASTIC OPTICAL FIBER

BACKGROUND

The technology disclosed herein generally relates to processes for polishing end faces of optical fibers and, more particularly, relates to polishing end faces of plastic optical fibers.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Optical fibers can be made of glass or plastic.

Plastic optical fiber can be substituted for copper conductors in avionics systems (e.g., an aircraft data bus network) to reduce size, weight and power. An important aspect of a fiber optical communication is that of connecting two fiber optical cables such that optical loss is minimized. Temporary or semi-permanent connections are made by means of specialized optical fiber connectors. It is often necessary to align an optical fiber with another optical fiber. This can involve either carefully aligning the fiber and placing it in contact with the device, or using a lens to allow coupling. In some cases the end of the fiber is polished into a curved form that makes it act as a lens.

For commercial avionics applications, a defect-free POF end face finish is important because the POF link length in commercial aircraft ranges from 30 to 100 meters. In some aircraft models, the avionics system comprises one or more POF converters in the forward section of the aircraft and one POF converter in the aft section of the aircraft. Each forward POF converter is connected to the aft POF converter by POF having a relatively long length. The high optical loss of the POF introduces an optical loss in the connections between the forward and aft POF converters. In addition, there are multiple POF optical connectors in the POF link. The connector loss depends on the POF end face quality. A poor POF end face can introduce an additional optical loss per connector. The provision of smooth POF end faces is important to reduce the connectors' optical coupling loss for avionics POF networks where the optical link budget is very tight due to a relatively long POF length.

Future airplane programs will be using avionics networks with much higher data rates (>1 Gbits/sec). Gigabit-data-rate fiber optical networks will use gigabit-data-rate transceivers equipped with high-spectral-purity distributed feedback (DFB) lasers. The multi-mode glass optical fiber (GOF) used in some legacy avionics systems is not suitable for high-data-rate fiber optical transceivers with DFB lasers because of a modal noise issue.

A plastic optical fiber capable of transmitting data at rates faster than 1 gigabits per second will be referred to herein as a "gigabit plastic optical fiber" (GbPOF). A commercially available GbPOF is the Fontex GbPOF from Asahi Company, which has a core and cladding made of transparent carbon-hydrogen bond-free perfluorinated polymer. The perfluorinated polymer is ductile, flexible, durable, and does not break during tight cable bending, thereby preventing breakage during installation in an airplane. In contrast to a pure silica GOF core, a multi-mode GbPOF with the same core diameter is more imperfect with long random polymer chains in spaghetti shapes. These polymer chains create strong forward mode coupling and result in less reflected light that can interfere with the laser source. The strong mode coupling in a GbPOF core also reduces the coherency of the laser source and results in minimal modal interference along the fiber length. GbPOF is a good alternative for use in future airplane systems to replace multi-mode glass optical fiber.

A smooth GbPOF end face is very important to reduce the fiber optical connectors' optical coupling loss for high-data-rate avionics GbPOF networks where the optical link budget is very tight due to a relative long GbPOF length (30 to 100 meters) in a commercial airplane. Because of the softness and ductility of the perfluorinated polymer material, it is difficult to polish the fiber end face without scratch marks and contamination using conventional GOF end face polishing techniques. Instead of cleanly abrading away (as GOF does during polishing), the perfluorinated polymer material tends to smear more than abrade. GOF is a much harder material and the end face can be cleaned with solvent and a blow dry process, whereas perfluorinated fiber is susceptible to damage during cleaning of debris. In addition, GbPOF has typical diameter of 0.5 mm and GOF's typical diameter is 0.125 mm. This difference in diameter and the GbPOF material softness makes the GbPOF more difficult to achieve a high-quality polished end face.

There is a need for a polishing process that can produce defect-free GbPOF end faces for use in high-data-rate GbPOF networks.

SUMMARY

The subject matter disclosed in detail below is directed to a process for polishing the end face of a gigabit plastic optical fiber (GbPOF) to produce a mirror smooth surface without any defect. Smooth GbPOF end faces reduce the optical coupling loss when two plastic optical fibers are connected. The polishing process can be used to produce GbPOF end faces which are free of defects such as scratches.

The polishing process involves the use of successive abrasive films having decreasing surface roughness to abrade the end of a GbPOF. Each abrasive film has a surface with hard abrasive particles that abrade the surface to be polished as one of the abrasive film and surface moves relative to the other while in contact with applied pressure. More specifically, each subsequently applied abrasive film has a mean particle size which is less than the mean particle size of the previously applied abrasive film. In one proposed implementation, the last adhesive film applied has a mean particle size of 0.3 micron.

Although various embodiments of processes for polishing end faces of gigabit plastic optical fibers for use in gigabit-data-rate fiber optical networks are described in some detail later herein, one or more of those embodiments may be characterized by one or more of the following aspects.

One aspect of the subject matter disclosed in detail below is a process for polishing an end face of a plastic optical fiber, comprising: (a) abrading a dry end face of the plastic optical fiber for a first time duration using a first abrasive film having a first mean particle size; (b) after step (a), abrading the dry end face of the plastic optical fiber for a second time duration using a second abrasive film having a second mean particle size which is less than the first mean particle size; and (c) after step (b), abrading the dry end face of the plastic optical fiber for a third time duration using a third abrasive film having a third mean particle size which is less than the second mean particle size. In accordance with one proposed implementation, the first mean particle size is approximately equal to 3 microns; the second mean particle size is approximately equal to 1 micron; and the third mean particle size is approximately equal to 0.3 micron. The innovative polishing process proposed herein is especially beneficial when applied to graded-index plastic optical fiber having a core and a cladding made of a transparent carbon-hydrogen bond-free perfluorinated polymer and having a data rate capability equal to at least 1 gigabit per second.

Another aspect of the subject matter disclosed in detail below is a process for polishing an end face of a plastic optical fiber, comprising: (a) abrading a dry end face of the plastic optical fiber for a first time duration using a first abrasive film having a first mean particle size; (b) after step (a), abrading the dry end face of the plastic optical fiber for a second time duration using a second abrasive film having a second mean particle size which is less than the first mean particle size; (c) after step (b), abrading the dry end face of the plastic optical fiber for a third time duration using a third abrasive film having a third mean particle size which is less than the second mean particle size; and (d) after step (c), abrading the dry end face of the plastic optical fiber for a fourth time duration using a fourth abrasive film having a fourth mean particle size which is less than the third mean particle size. (Because this paragraph recites an additional step in the polishing process. the last abrasive film is referred to as the "fourth" abrasive film used in the process instead of being referred to as the "third" abrasive film, as in the immediately preceding paragraph.)

A further aspect of the subject matter disclosed in detail below is a process for polishing an end face of a plastic optical fiber, comprising: (a) pressing a dry end face of the plastic optical fiber against a first abrasive film with a first pressure, wherein the abrasive particles of the first abrasive film have a first mean particle size; (b) moving the first abrasive film relative to the dry end face for a first time duration while the dry end face is being pressed against the first abrasive film with the first pressure; (c) pressing the dry end face of the plastic optical fiber against a second abrasive film with a second pressure, wherein the abrasive particles of the first abrasive film have a second mean particle size which is less than the first mean particle size; (d) moving the second abrasive film relative to the dry end face for a second time duration while the dry end face is being pressed against the second abrasive film with the second pressure; (e) pressing the dry end face of the plastic optical fiber against a third abrasive film with a third pressure, wherein the abrasive particles of the third abrasive film have a third mean particle size which is less than the second mean particle size; (f) moving the third abrasive film relative to the dry end face of the plastic optical fiber for a third time duration while the dry end face is being pressed against the third abrasive film with the third pressure; (g) pressing the dry end face of the plastic optical fiber against a fourth abrasive film with a fourth pressure, wherein the abrasive particles of the fourth abrasive film have a fourth mean particle size which is less than the third mean particle size; and (h) moving the fourth abrasive film relative to the dry end face of the plastic optical fiber for a fourth time duration while the dry end face is being pressed against the fourth abrasive film with the fourth pressure.

In accordance with one embodiment of the process described in the immediately preceding paragraph, a pressure of 1.5 pounds is applied during steps (a), (c), and (e), and a pressure of 0.5 pound is applied during step (g). In addition, the abrasive particles of the second and third abrasive films are diamond particles, and the abrasive particles of the first and fourth abrasive films are aluminum oxide particles. In one proposed implementation, the first mean particle size is 15 microns; the second mean particle size is 3 microns; the third mean particle size is 1 micron; and the fourth mean particle size is 0.3 micron.

Yet another aspect of the subject matter disclosed in detail below is a fiber optical device comprising a ferrule and a gigabit plastic optical fiber having a portion disposed inside the ferrule and a polished flat end face without scratches. The fiber optical device is made by a process comprising: (a) adhering the gigabit plastic optical fiber inside the ferrule using epoxy with one end of the gigabit plastic optical fiber projecting outside one end of the ferrule; (b) after step (a), abrading a dry end face of the plastic optical fiber for a first time duration using a first abrasive film having a first mean particle size; (c) after step (b), abrading the dry end face of the plastic optical fiber for a second time duration using a second abrasive film having a second mean particle size which is less than the first mean particle size; and (d) after step (c), abrading the dry end face of the plastic optical fiber for a third time duration using a third abrasive film having a third mean particle size which is less than the second mean particle size. In accordance with one proposed implementation, the third mean particle size is approximately equal to 0.3 micron.

Other aspects of processes for polishing end faces of gigabit plastic optical fibers for use in gigabit-data-rate fiber optical networks are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale and the relative thicknesses of layers depicted in these diagrams does not precisely reflect the actual thicknesses.

FIGS. 6A-6C are diagrams representing three-dimensional views of one end of a fiber optical device during three stages of an end face polishing process in accordance with one embodiment.

Reference will hereinafter be made to the drawings in which similar elements in different drawings bear the same reference numerals.

DETAILED DESCRIPTION

Illustrative embodiments of processes for polishing end faces of gigabit plastic optical fibers for use in gigabit-data-rate fiber optical networks are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
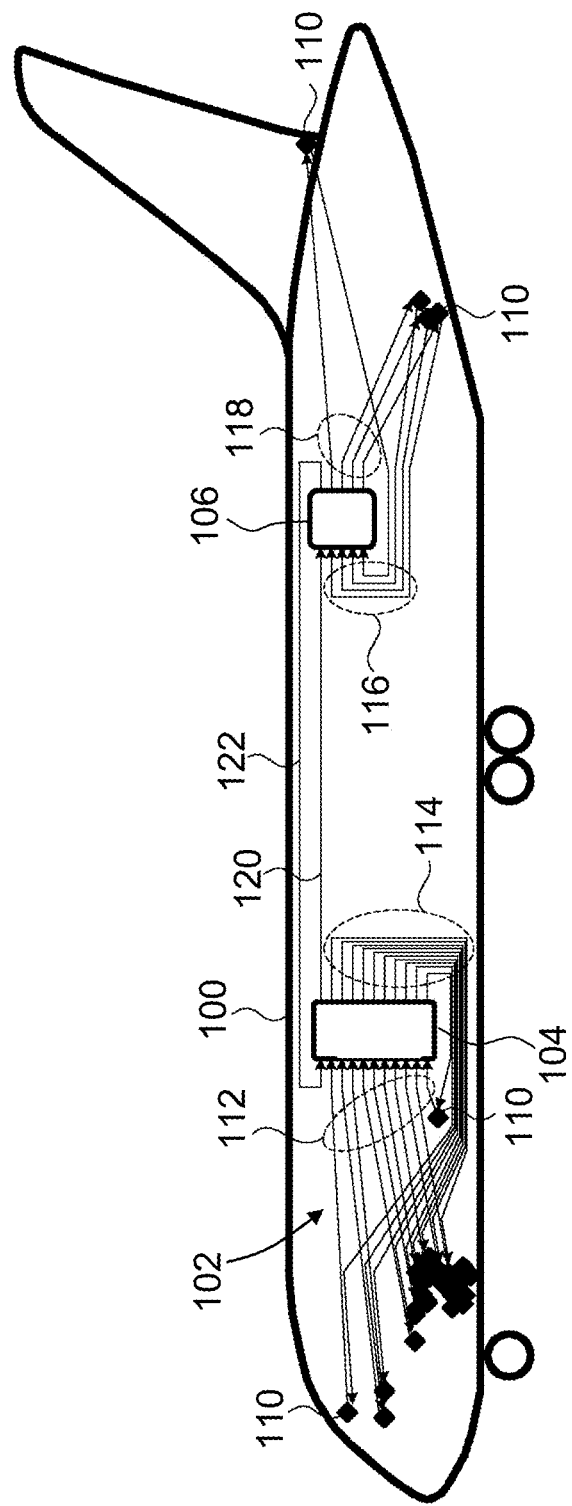
FIG. 1 is a diagram depicting a communication system that uses plastic optical fibers instead of an electrical bus to connect line replaceable units onboard an aircraft.

FIG. 1 depicts an example of an aircraft 100 that has a number of line replaceable units 110. For ease of depiction, not all of the line replaceable units 110 have been labeled. The installation of fiber optical devices and systems on an aircraft 100 is described herein for the purpose of illustration only. Implementation of the devices described herein is not limited solely to the environment of an aircraft, but rather may be utilized in fiber optical systems onboard other types of vehicles or fiber optical systems which are not installed onboard vehicles.

Individual line replaceable units 110 can be any component that sends and receives signals from other components. For example, line replaceable units 110 can include sensor components, flight control components, and the like. Within the aircraft 100 depicted in FIG. 1, the aircraft 100 includes a first grouping of line replaceable units 110 in the forward section of the aircraft 100 and a second grouping of line replaceable units 110 in the aft section of the aircraft 100.

FIG. 1 further depicts a communication system 102 that uses plastic fiber optics instead of an electrical bus to interconnect the line replaceable units 110. The communication system 102 includes a first optical star coupler 104 and a second optical star coupler 106. The communication system 102 further includes the following: (a) plastic optical fiber transmission lines 112 from each of the line replaceable units 110 in the forward section of the aircraft 100 to the first optical star coupler 104; (b) plastic optical fiber receiving lines 114 connecting the first optical star coupler 104 back to each of the line replaceable units 110 in the forward section of the aircraft 100; (c) plastic optical fiber transmission lines 116 from each of the line replaceable units 110 in the aft section of the aircraft 100 to the second optical star coupler 106; (d) plastic optical fiber receiving lines 118 connecting the second optical star coupler 106 back to each of the line replaceable units 110 in the aft section of the aircraft 100; (e) a first long plastic optical fiber transmission line 120 connecting the first optical star coupler 104 to the second optical star coupler 106; and (f) a second long plastic optical fiber transmission line 122 connecting the first optical star coupler 104 to the second optical star coupler 106.

As described above, the line replaceable units 110 are connected to optical star couplers 104 and 106 via plastic optical fibers, and the optical star couplers 104 and 106 are connected to each other via plastic optical fibers. Each optical star coupler may be configured to receive optical signals from one set of plastic optical fibers and to transmit a combined optical signal, representing the combination of all of the optical signals received from each plastic optical fiber, via another set of plastic optical fibers. In this manner, the signals sent by each of the line replaceable units 110 are received by all of the other line replaceable units 110. Some of the line replaceable units are separated by relatively long distances.

Figure 2:
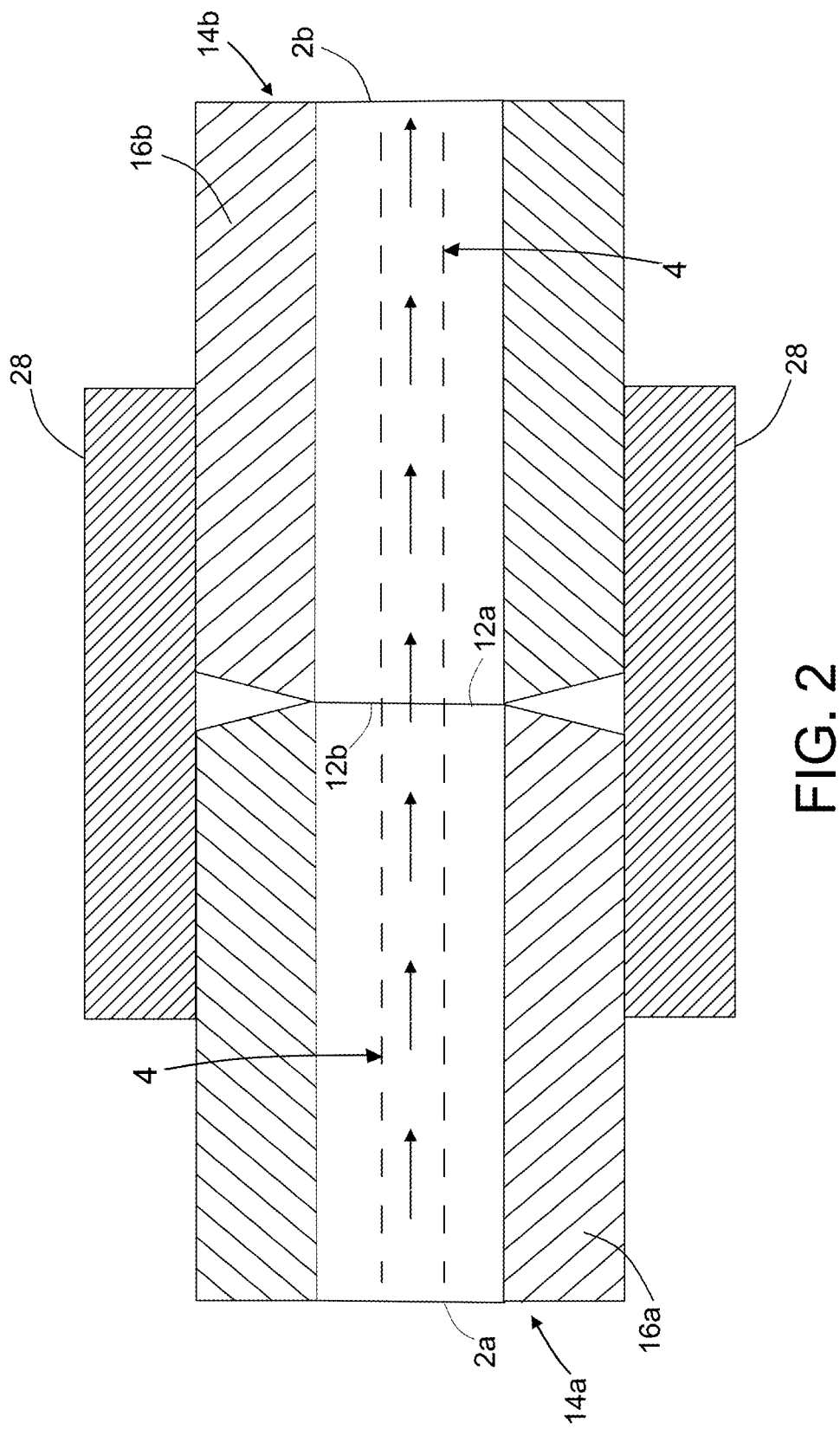
FIG. 2 is a diagram representing a sectional view of an optical coupling of two optical fibers using a connector.

Due to the long length of some of the lines depicted in FIG. 1, it is common to use connectors to optically couple a multiplicity of shorter-length plastic optical fibers in series. FIG. 2 is a sectional view depicting an optical coupling of one end of a first fiber optical device 14a to one end of a second fiber optical device 14b using a connector 28. The first fiber optical device 14a comprises a gigabit plastic optical fiber 2a (hereinafter "GbPOF 2a") surrounded by a ferrule 16a made of metal (e.g., stainless steel or aluminum) or ceramic, while the second fiber optical device 14b comprises a gigabit plastic optical fiber 2b (hereinafter "GbPOF 2b") surrounded by a ferrule 16b made of metal or ceramic. It is well known that each plastic optical fiber depicted in FIG. 2 comprises a polymeric core 4 (indicated by dashed lines in FIG. 2) surrounded by polymeric cladding (not shown). In the example depicted in FIG. 2, GbPOF 2a and 2b have substantially the same diameter. In this example, the respective end faces 12a and 12b of gigabit plastic optical fibers 2a and 2b are planar and in contact. Accordingly, rays of light (represented by arrows) propagating from left to right (as seen in FIG. 2) along the core of GbPOF 2a can pass into the core of GbPOF 2b (usually with some optical loss). In alternative configurations, the opposing end faces 12a and 12b of GbPOF 2a and 2b may be separated by a stop or spacer to form an air gap therebetween.

Many different types of optical fiber connectors exist and are commercially available. Accordingly, FIG. 2 does not seek to depict any particular configuration or type of optical fiber connector, but rather simply represents (in section) a generic connector as a generally circular cylindrical structure. In addition, it is well known that some connectors include springs and associated structure for urging the ends of two fiber optical devices into contact with each other. Such springs and associated structure are also not shown in FIG. 2.

As previously mentioned, the innovative process for polishing the end face of a GbPOF disclosed herein has been tested on a GbPOF made of transparent carbon-hydrogen bond-free perfluorinated polymer commercially available from Asahi Glass Co., Ltd. The chemical composition of the base polymer for this product ("Fontex" plastic optical fiber) is a chain consisting of a repeating unit in the form of a molecule having six carbon atoms, one oxygen atom, and ten fluorine atoms. The perfluorinated polymer has fluorine atoms bonded to the carbon atoms instead of having hydrogen atoms bonded to the carbon atoms. An optical fiber having a core and cladding made of perfluorinated polymer enables higher data rates when used in large-capacity communication systems.

Basically, the aforementioned commercially available GbPOF is made of long chains of polymers with dopant mixed in the polymer chains to form a doped polymer matrix. The polymers of the GbPOF are chemically bonded, but the dopant is not chemically bonded to the polymers. In general, in the case of GbPOF, the dopant molecules are impurities intentionally introduced to the GbPOF polymer chains during the GbPOF fabrication process. What enables a graded-index GbPOF to operate at a high data rate is dopant that is distributed in the center of the core of the GbPOF with a gradient (or Gaussian) index profile.

Figure 3A:
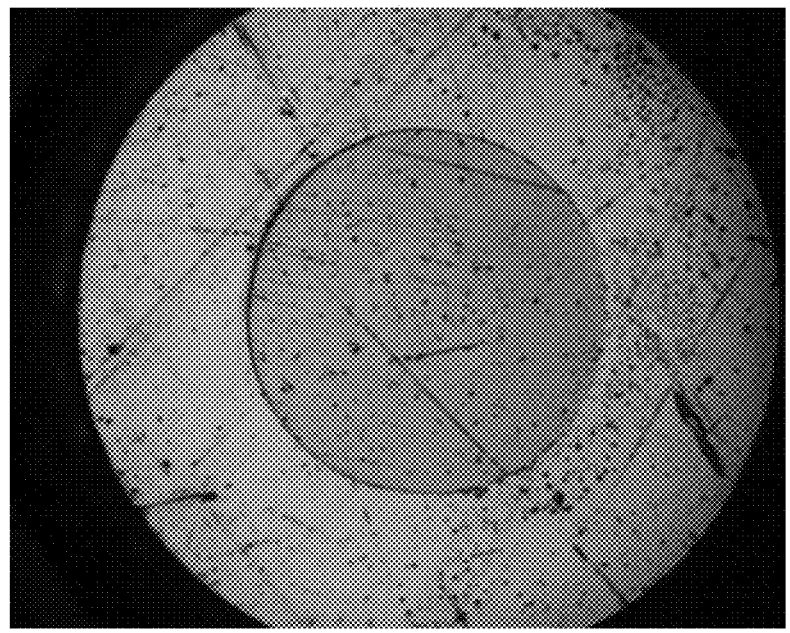
FIGS. 3A and 3b are images showing poor-quality end faces of respective gigabit plastic optical fibers following polishing using a process designed for plastic optical fibers made of polymethyl methacrylate. Magnification 200×.
Figure 3B:
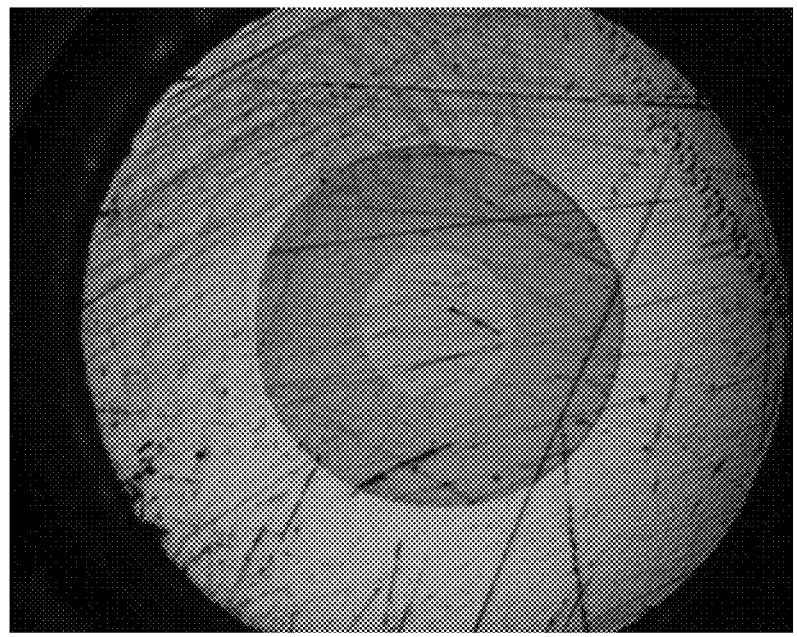

Because of the softness and ductility of the perfluorinated polymer material used in commercially available GbPOF, it is difficult to polish the fiber end face without scratch marks and contamination using conventional GOF end face polishing techniques. Instead of cleanly abrading away (as GOF does during polishing), the perfluorinated polymer material tends to smear more than abrade. FIGS. 3A and 3b are images showing poor-quality end faces of respective gigabit plastic optical fibers following polishing using a process designed for plastic optical fibers made of polymethyl methacrylate. Scratch marks are plainly visible on the perfluorinated polymer material.

A smooth GbPOF end face is very important to reduce the fiber optical connector's optical coupling loss for high-data-rate avionics GbPOF networks where the optical link budget is very tight due to a relative long GbPOF length (30 to 100 meters) in a commercial airplane. The connector's optical coupling loss depends on the quality of the confronting (in this example, also abutting) end faces of the gigabit plastic optical fibers 2a and 2b. A poor GbPOF end face can introduce an additional optical loss per connector. The provision of smooth GbPOF end faces is important to reduce the connector's optical coupling loss for avionics GbPOF networks where the optical link budget is very tight due to relatively long GbPOF lengths.

To minimize the connector's optical coupling loss, it would be desirable to provide a polishing process capable of producing defect-free GbPOF end faces. Such a polishing process will now be described. The GbPOF end face polishing process described herein enables satisfactory optical coupling of GbPOF having lengths of 30 to 100 meters, which lengths are common in some commercial airplanes having multiple line replaceable units communicatively coupled by means of an optical data transfer network. The innovative process disclosed herein may be applied to GbPOF made of perfluorinated polymer having the structural formula set forth above and to GbPOF made of polymeric material having similar softness and ductility.

The polishing process disclosed herein uses an automated polishing machine such as the Model HDC-1000, which is commercially available from Domaille Engineering, LLC, Rochester, Minn. The structure and functionality of a similar automated polishing machine designed to polish end faces of optical fibers are described in detail in U.S. Pat. No. 8,708,776, which is assigned to Domaille Engineering, LLC. To avoid incorporation by reference, a brief summary of the structure and functionality of such automated polishing machines will now be provided.

Polishing machines for polishing optical fibers typically include a rotatable platen and a fixture, such as an arm, which positions and supports the optical fibers above the rotating platen during the polishing process. Typically, the end face of an optical fiber is lowered onto an abrasive film which rests on the rotatable plate and, depending upon various factors such as the particle size distribution of the abrasive film, the rotational speed of the platen, the pressure applied, and the duration of abrasion, can be polished to a suitable finish for a particular application.

Optical fiber polishing machines generally include a fixture, coupled to the mounting mechanism, that is capable of holding and gripping one or more fiber optical devices (e.g., by holding a ferrule or a connector) and advancing them under controlled conditions of speed and force to move a plurality of end faces into engagement with the rotating abrasive. The polishing unit disclosed in U.S. Pat. No. 8,708,776 comprises a pneumatic overarm assembly, a platen assembly, a processor, a porting device for a portable memory device, and an input device. The pneumatic arm assembly comprises an overarm hingedly coupled along one end of a base and rotatable about a hinge, and a mounting fixture having a number of ports for affixing optical fibers within the fixture. For example, the mounting fixture may include ports configured to hold optical fiber connectors and/or optical fiber ferrules. The platen assembly includes a rotatable platen configured to retain an abrasive film or polishing pad for polishing the end faces of fiber optical devices being held by the mounting fixture. The rotatable platen is also movable in an eccentric fashion with respect to the mounting fixture. For example, in some cases the platen rotates about the axis of the platen, while the platen axis revolves along a circular path which is centered at the center of the mounting fixture. Thus, end faces of fiber optical devices fixed within the mounting fixture are polished or ground against an abrasive film on the platen as the platen moves relative to the mounting fixture.

In accordance with the polishing process disclosed herein, the above-described automated polishing machine is operated with selected time durations, selected pressures, and selected platen rotational speeds. In alternative embodiments, the polishing machine may be configured to move the optical fiber relative to a stationary abrasive film.

Figure 4:
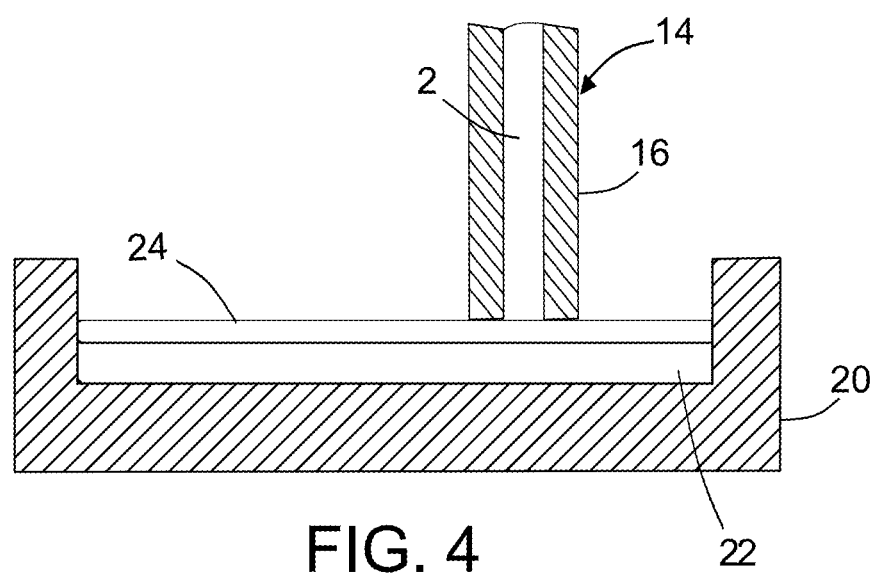
FIG. 4 is a diagram representing a sectional view of a fiber optical device whose end face is being polished by a polishing machine using an abrasive film in accordance with one embodiment.

FIG. 4 is a diagram representing a sectional view of a fiber optical device 14 comprising a GbPOF 2 surrounded by a ferrule 4 (shown in section). In the state depicted in FIG. 4, the end face of the GbPOF 2 is being polished using an abrasive film 24 (not shown in section) during an automated polishing operation. The abrasive film 24 lies on top of a rubber pad 22 (not shown in section), which rubber pad 22 in turn lies on top of a rotatable platen 20 (shown in section). For the purpose of simplification, deflection of the abrasive film 24 due to the pressure exerted by the end face of the fiber optical device 10 on the underlying rubber pad 22 is not shown. The abrasive film 24 may comprise a Mylar film having particles made of aluminum oxide or diamond adhered to one side of the Mylar film by a layer of resin. It should be appreciated that abrasive particles made from materials other than aluminum oxide and diamond may be used.

During the polishing step depicted in FIG. 4, the end face of the GbPOF and the end face of the ferrule 4 are pressed against the abrasive film 24 with a specified pressure. While the specified pressure is being applied, the rotatable platen 20 is rotated and oscillated for a specified time duration, during which the abrasive film 24 moves relative to and abrades the end faces. Following the expiration of the specified time duration, the rotation and oscillation of the rotatable platen 20 are stopped and the end faces of GbPOF 2 and ferrule 4 are separated from the abrasive film 24. The abrasive film 24 may then be removed and replaced by an abrasive film having a smaller mean particle size.

Figure 5:
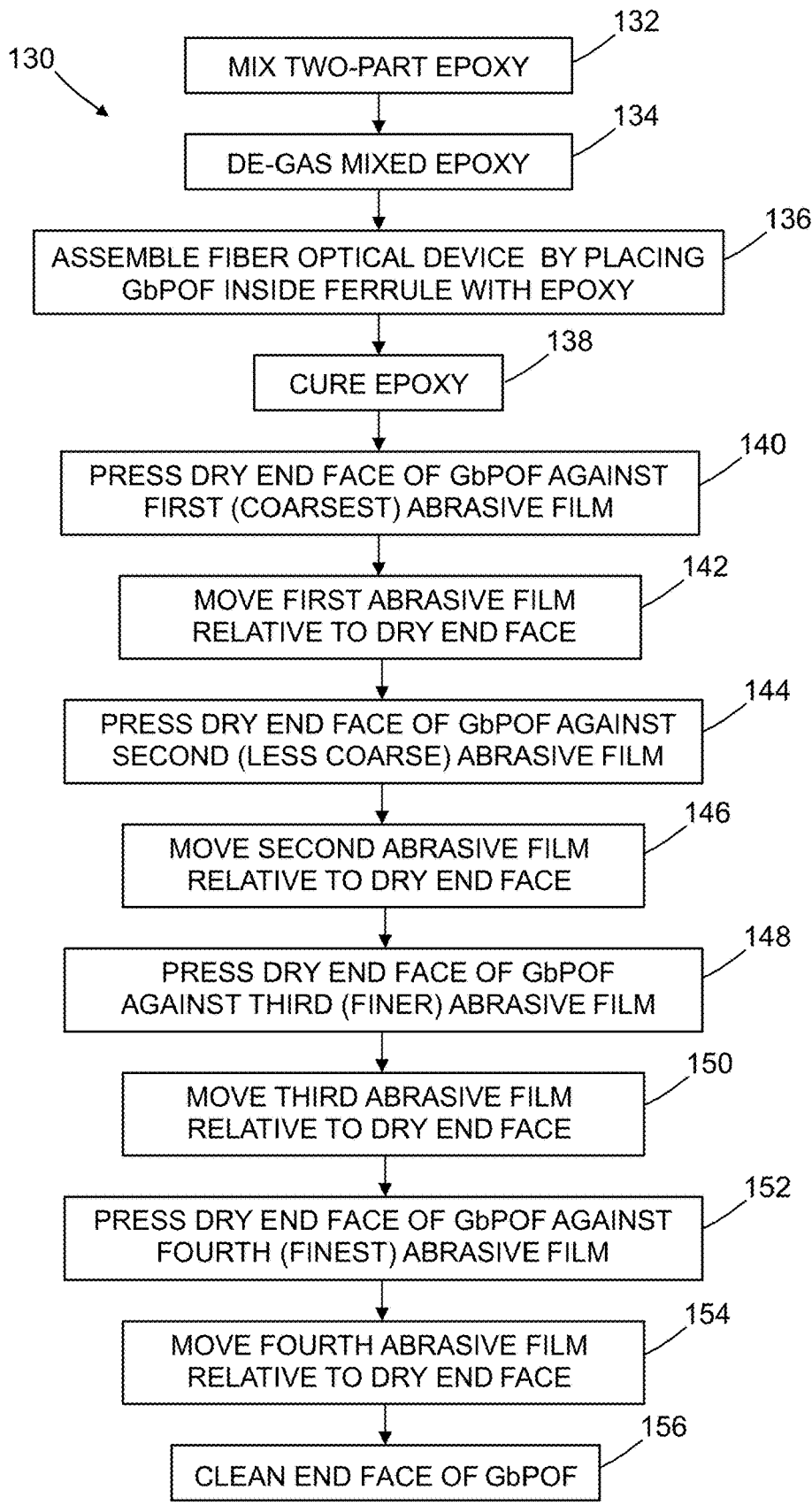
FIG. 5 is a flowchart identifying steps of a process for polishing an end face of a gigabit plastic optical fiber in accordance with one embodiment.

FIG. 5 is a flowchart identifying steps of a process 130 for polishing an end face of a GbPOF 2 in accordance with one embodiment. The process 130 includes pre-polish process steps followed by automated polish process steps.

The first pre-polish process step is mixing the parts of a two-part epoxy for 5 minutes or some other duration prescribed by the epoxy manufacturer (step 132). In one proposed implementation, a two-part high-temperature epoxy Epotek 353ND having a Shore D Hardness of 85 was used. An epoxy is needed that will provide a hard bonding surface between the hard ceramic ferrule and the softer GbPOF. One of the requirements for a debris-free surface is an epoxy that will abrade cleanly during polishing and not chip or break away, causing damage to the fiber and adding epoxy debris.

Following mixing of the two epoxy components, the mixed epoxy is de-gassed to remove air bubbles from the epoxy (step 134). In one proposed implementation, the mixed epoxy is heated to a temperature of 45° C. for 20 minutes (e.g., on a hot plate). Alternatively, air bubbles may be removed by placing the mixed epoxy inside a centrifuge.

After de-gassing, the fiber optical device is assembled by placing the GbPOF inside a ceramic ferrule with epoxy therebetween (step 136). Then the assembly is placed inside an oven and the epoxy is cured at an elevated temperature for a sufficient period of time (step 138). In one proposed implementation, the epoxy is cured inside an oven at 70° C. for 3 hours. However, the temperature protocol may be varied depending on the specific epoxy used and the specific material of the GbPOF.

The assembled fiber optical device is then mounted to a fixture of an optical fiber polishing machine. A series of polishing steps are then performed using increasingly finer abrasive films. Prior to each polishing step, the machine is set up manually to include a selected abrasive film lying on top of a selected rubber pad (as previously described with reference to FIG. 4), which abrasive film exerts a selected pressure on the end of the plastic optical fiber. In accordance with one embodiment, four different abrasive films are employed in sequence. (These four abrasive films will be respectively referred to herein, in the alternative, as the "first" or "coarsest", the "second" or "less coarse", the "third" or "finer", and the "fourth" or "finest" abrasive films, respectively.) During each polishing step, one of the optical fiber and abrasive film is moved relative to the other, which movements are automated and controlled by a computer. No liquid is used during the automated polish process steps, meaning that the end face of the GbPOF is dry during the abrading operations.

Referring again to FIG. 5, during initial set-up, a first rubber pad (e.g., having a Shore hardness equal to 64) is placed on the polishing machine, a first abrasive film is placed on top of the first rubber pad, and a dry end face of the GbPOF is pressed against the first abrasive film with a first pressure (step 140). The abrasive particles of the first abrasive film have a first mean particle size. For example, the first abrasive film may include particles of aluminum oxide ($Al_2O_3$) having a mean particle size approximately equal to 15 microns. Then one of the first abrasive film and GbPOF are moved relative to the other (e.g., the film is rotated relative to the optical fiber) for a first time duration while the dry end face of the GbPOF is being pressed against the first abrasive film with the first pressure (step 142). The speed of rotation, first pressure and first time duration are selected to achieve at least partial removal of excess epoxy at the fiber/ferrule interface. In one implementation, the speed was 20 rpm, the first pressure was 1.5 pounds, and the first time duration was 6 minutes. The end face of the GbPOF is abraded during step 142.

During the next set-up procedure, the first abrasive film is removed, a second abrasive film is placed on the first rubber pad, and the abraded dry end face of the GbPOF is pressed against the second abrasive film with a second pressure (step 144). The abrasive particles of the second abrasive film have a second mean particle size which is less than the first particle size. For example, the second abrasive film may include diamond particles having a mean particle size approximately equal to 3 microns. Then one of the second abrasive film and GbPOF are moved relative to the other (e.g., the film is rotated relative to the optical fiber) for a second time duration while the abraded dry end face of the GbPOF is being pressed against the second abrasive film with the second pressure (step 146). The speed of rotation, second pressure and second time duration are selected to achieve convex shaping of the end faces of the GbPOF and the ceramic ferrule. In the aforementioned implementation, the speed was 20 rpm, the second pressure was 1.5 pounds, and the second time duration was 6 minutes. The end face of the GbPOF is both abraded and shaped during step 146.

Still referring to FIG. 5, during the next set-up procedure, the second abrasive film is removed, a third abrasive film is placed on the first rubber pad, and the abraded and shaped dry end face of the GbPOF is pressed against the third abrasive film with a third pressure (step 148). The abrasive particles of the third abrasive film have a third mean particle size which is less than the second particle size. For example, the third abrasive film may include diamond particles having a mean particle size approximately equal to 1 micron. Then one of the third abrasive film and GbPOF are moved relative to the other (e.g., the film is rotated relative to the optical fiber) for a third time duration while the abraded and shaped dry end face of the GbPOF is being pressed against the third abrasive film with the third pressure (step 150). The speed of rotation, third pressure and third time duration are selected to prepare the end face of the GbPOF for final polishing. In the aforementioned implementation, the speed was 20 rpm, the third pressure was 1.5 pounds, and the third time duration was 4 minutes. The end face of the GbPOF is further abraded during step 150. After each polishing run, the ferrule ends encasing the GbPOF fibers are wiped clean using a soft lab wipe soaked with 3 tenths of a micron of filtered water.

During the next set-up procedure, the third abrasive film and the first rubber pad are removed, a second rubber pad (e.g., having a Shore hardness equal to 95) is placed on the polishing machine, a fourth abrasive film is placed on top of the second rubber pad, and the abraded dry end face of the GbPOF is pressed against the fourth abrasive film with a fourth pressure (step 152). The abrasive particles of the fourth abrasive film have a fourth mean particle size which is less than the third particle size. For example, the fourth abrasive film may include particles of aluminum oxide having a mean particle size approximately equal to 0.3 micron. Then one of the fourth abrasive film and GbPOF are moved relative to the other (e.g., the film is rotated relative to the optical fiber) for a fourth time duration while the abraded dry end face of the GbPOF is being pressed against the fourth abrasive film with the fourth pressure (step 154). The speed of rotation, fourth pressure and fourth time duration are selected to achieve a final polishing state in which the end face of the GbPOF is planar. In the aforementioned implementation, the speed was 20 rpm, the fourth pressure was 0.5 pounds, and the fourth time duration was 4 minutes. In the final polished state, the planar end face of the GbPOF is co-planar with the end face of the ceramic ferrule. Upon completion of the finest polishing step, the fiber optical device 14 is removed from the polishing machine.

Optionally, the end face of the GbPOF 2 can be inspected to ensure that its smoothness is within applicable manufacturing tolerances or engineering specifications. There normally is no cleaning required after the final polish when the polished fiber optic connectors are removed from the polisher. Optionally, the finally polished end face of the GbPOF may be cleaned (step 156). A cotton swab dampened with isopropyl alcohol can be used, to avoid scratches to the fiber end face. The weight of the dampened cotton swab is the only force applied to the fiber. Before using the cotton swab cleaning method, a piece of polyimide tape lightly touching the fiber surface may be used to remove any large particles. Care is required when cleaning a GbPOF to avoid scratching or imbedding particles into the end face.

Figure 7A:
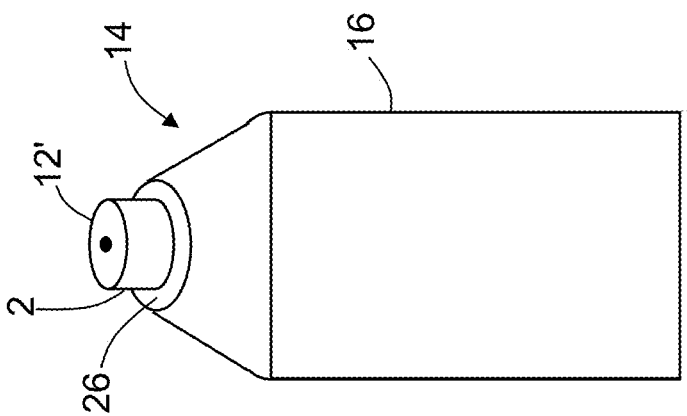
FIGS. 7A-7C are diagrams representing respective side views of the one end of the fiber optical device depicted in FIGS. 6A-6C.
Figure 7B:
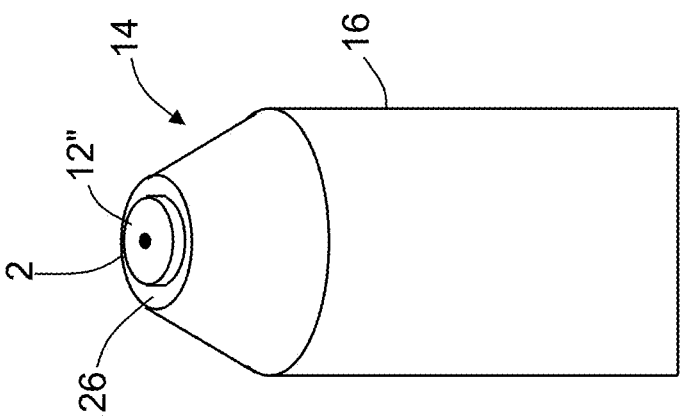
Figure 7C:
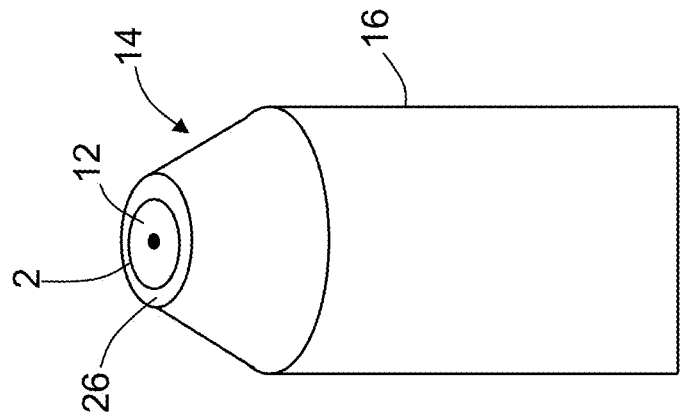

FIGS. 6A-6C are diagrams representing three-dimensional views of one end of a fiber optical device during three stages of an end face polishing process in accordance with one embodiment. FIGS. 7A-7C are diagrams representing respective side views of the one end of the fiber optical device depicted in FIGS. 6A-6C.

FIGS. 6A and 7A depict the fiber optical device 14 at a post-assembly/pre-polishing stage following curing step 138 (see FIG. 5). At this stage, the end of GbPOF 2 projects beyond the end face 26 of the ferrule 16. The end face 12' of GbPOF 2 is planar. Following epoxy curing, there may be excess epoxy (not shown in FIGS. 6A and 7A) on end face 26 of ferrule 16, which cured excess epoxy would be removed during abrading step 142 (see FIG. 5).

FIGS. 6B and 7B depict the fiber optical device 14 at the stage between steps 146 and 148 (see FIG. 5). At this stage, the end of GbPOF 2 has been abraded in successive operations using a first abrasive film including aluminum oxide particles having a mean particle size of 15 microns and then a second abrasive film including diamond particles having a mean particle size of 3 microns. Upon completion of steps 140, 142, 144, and 145 (see FIG. 5), the end of GbPOF 2 still projects beyond the end face 26 of ferrule 16 and has a convex end face 12".

FIGS. 6C and 7C depict the fiber optical device 14 at the stage following completion of steps 148, 150, 152, and 154 (see FIG. 5). At this stage, the end of GbPOF 2 no longer projects beyond the end face 26 of ferrule 16 and now has a planar end face 12. The planar end face 12 of GbPOF 2 is co-planar with the end face 26 of ferrule 16. In the state depicted in FIGS. 6C and 7C, the polished end of GbPOF 2 has a defect-free end face 12 that will not produce unacceptable optical coupling loss when inserted in a connector 28 and optically coupled to another GbPOF (as depicted in FIG. 2).

Figure 8:
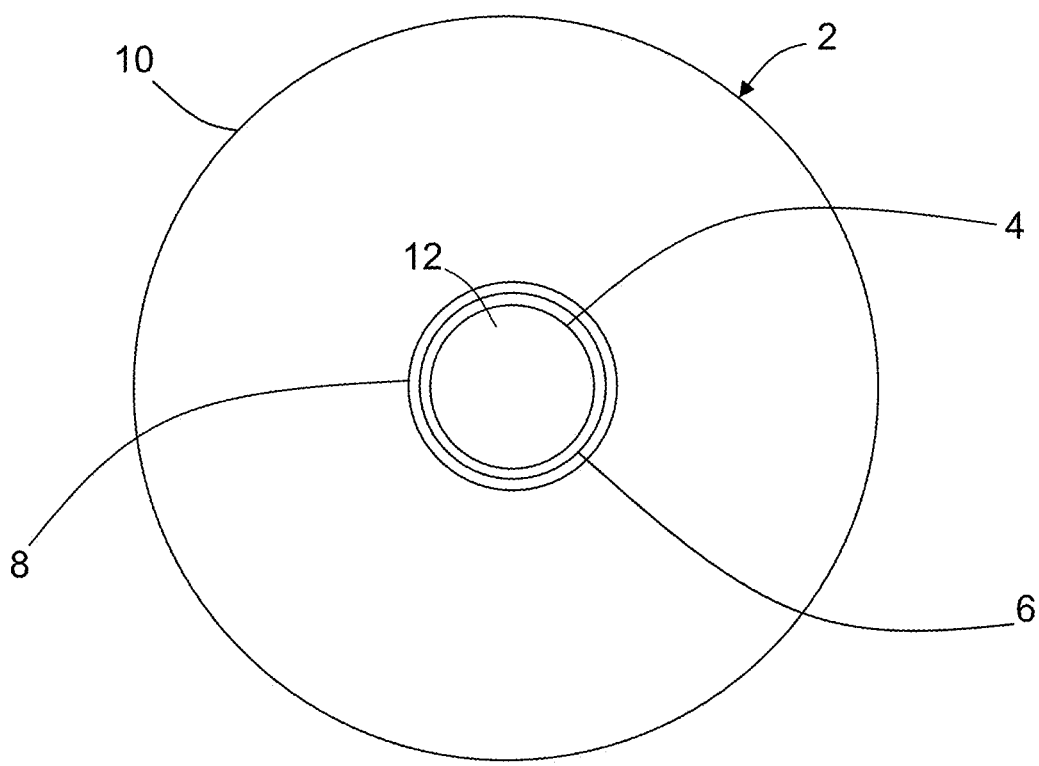
FIG. 8 is a diagram representing an end view of a typical gigabit plastic optical fiber. (The diameters of the respective components of the optical fiber are not drawn to scale.)

FIG. 8 is a diagram representing an end view of a typical GbPOF 2. (The diameters of the respective components of the optical fiber are not drawn to scale.) The GbPOF 2 includes a core 4, a first cladding 6, a second cladding 8, and a reinforcement layer 10. The first cladding 6 surrounds the core 4; the second cladding 8 surrounds the first cladding 6, and the reinforcement layer 10 surrounds the second cladding 8. The core 4 and cladding 6 are made of transparent carbon-hydrogen bond-free perfluorinated polymer. The reinforcement layer 10 may be made of fiber-reinforced plastic material.

The polishing process disclosed herein can be employed to produce defect-free GbPOF end faces, which has the benefit of enabling the provision of very low-loss POF connector interfaces for avionics networks used in commercial or military aircraft. In accordance with some optical fiber polishing techniques, a lubricating liquid (such as water or alcohol) is used. In accordance with the GbPOF polishing process disclosed herein, no liquid is used; the polishing process is dry. The ability to produce GbPOF having defect-free end faces enables a low-loss GbPOF connector interface which increases the length and data rate for optical data transfer networks used in commercial or military airplane avionics platforms.

Figure 9:
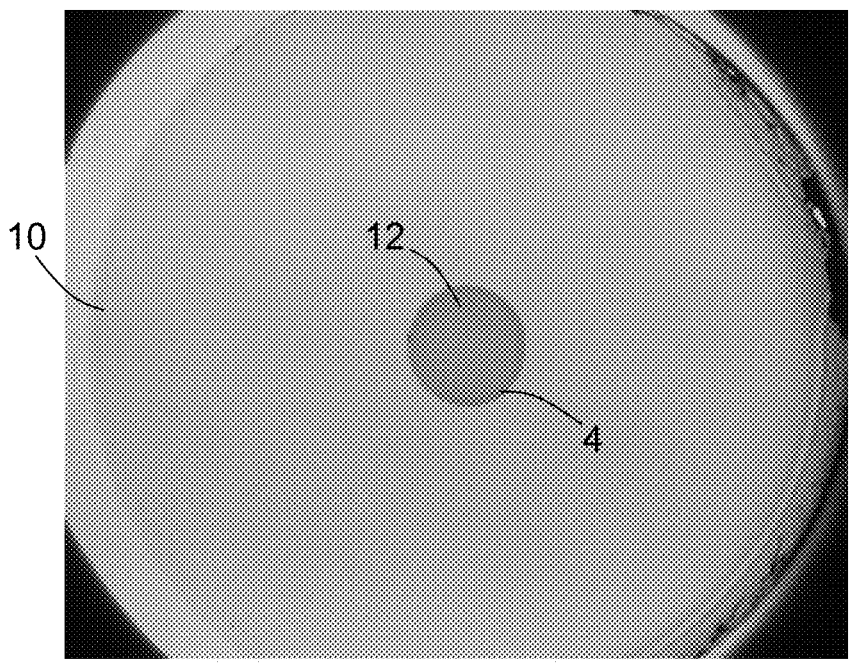
FIG. 9 is an image showing a high-quality end face of a gigabit plastic optical fiber following polishing using the innovative process disclosed herein. Magnification 200×.

FIG. 9 is an image showing a defect-free end face 12 of a GbPOF 2 (having a core 4 made of transparent carbon-hydrogen bond-free perfluorinated polymer) following polishing using the innovative process disclosed herein. FIG. 9 shows a GbPOF end face 12 without any scratch mark or defect. There are several types of GbPOF that can utilize the polishing process disclosed herein to achieve defect free end faces, including 0.5-mm-diameter graded-index GbPOF having a 55-micron-diameter core, 0.5-mm-diameter graded-index GbPOF having a 80-micron-diameter core, and other customized GbPOF with different cladding and core diameters. In accordance with one proposed implementation of a fiber optical device including a GbPOF inside a ceramic ferrule: the core of the GbPOF has an outer diameter of 55 microns; the cladding of the GbPOF has a thickness of 22 microns; the reinforcement layer of the GbPOF has an outer diameter of 495 microns (0.495 mm); and the ceramic ferrule has an outer diameter of 1.25 mm.

While processes for polishing end faces of gigabit plastic optical fibers for use in gigabit-data-rate fiber optical networks have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A process for polishing an end face of a plastic optical fiber made of perfluorinated polymer material, comprising:
    (a) abrading a dry end face of the plastic optical fiber for a first time duration using a first abrasive film having a first mean particle size approximately equal to 3 microns;
    (b) after step (a), abrading the dry end face of the plastic optical fiber for a second time duration using a second abrasive film having a second mean particle size approximately equal to 1 micron; and
    (c) after step (b), abrading the dry end face of the plastic optical fiber for a third time duration using a third abrasive film having a third mean particle size approximately equal to 0.3 micron.

2. The process as recited in claim 1, wherein a pressure of 1.5 pounds is applied during steps (a) and (b), and a pressure of 0.5 pound is applied during step (c).

3. The process as recited in claim 1, wherein the first duration is six minutes, the second duration is four minutes, and the third duration is four minutes.

4. The process as recited in claim 1, wherein the abrasive particles of the first and second abrasive films are diamond particles.

5. The process as recited in claim 4, wherein the abrasive particles of the third abrasive film are aluminum oxide particles.

6. The process as recited in claim 1, wherein the plastic optical fiber is graded-index plastic optical fiber having a core and a cladding made of a transparent carbon-hydrogen bond-free perfluorinated polymer.

7. The process as recited in claim 1, wherein the plastic optical fiber has a data rate capability equal to at least 1 gigabit per second.

8. The process as recited in claim 7, further comprising installing the plastic optical fiber in an avionics network onboard an aircraft after step (c).

9. A process for polishing an end face of a plastic optical fiber made of perfluorinated polymer material, comprising:
(a) abrading a dry end face of the plastic optical fiber for a first time duration using a first abrasive film having a first mean particle size approximately equal to 15 microns;
(b) after step (a), abrading the dry end face of the plastic optical fiber for a second time duration using a second abrasive film having a second mean particle size approximately equal to 3 microns;
(c) after step (b), abrading the dry end face of the plastic optical fiber for a third time duration using a third abrasive film having a third mean particle size approximately equal to 1 micron; and
(d) after step (c), abrading the dry end face of the plastic optical fiber for a fourth time duration using a fourth abrasive film having a fourth mean particle size approximately equal to 0.3 micron.

10. The process as recited in claim 9, wherein a pressure of 1.5 pounds is applied during steps (a) through (c), and a pressure of 0.5 pound is applied during step (d).

11. The process as recited in claim 9, wherein the abrasive particles of the second and third abrasive films are diamond particles, and the abrasive particles of the first and fourth abrasive films are aluminum oxide particles.

12. The process as recited in claim 9, wherein the plastic optical fiber is graded-index plastic optical fiber having a core and a cladding made of a transparent carbon-hydrogen bond-free perfluorinated polymer.

13. The process as recited in claim 9, further comprising installing the plastic optical fiber in an avionics network onboard an aircraft after step (d).

14. A process for polishing an end face of a plastic optical fiber made of perfluorinated polymer material, comprising:
(a) pressing a dry end face of the plastic optical fiber against a first abrasive film with a first pressure, wherein the abrasive particles of the first abrasive film have a first mean particle size approximately equal to 15 microns;
(b) moving the first abrasive film relative to the dry end faces for a first time duration while the dry end face is being pressed against the first abrasive film with the first pressure;
(c) pressing the dry end face of the plastic optical fiber against a second abrasive film with a second pressure, wherein the abrasive particles of the first abrasive film have a second mean particle size approximately equal to 3 microns;
(d) moving the second abrasive film relative to the dry end face for a second time duration while the dry end face is being pressed against the second abrasive film with the second pressure;
(e) pressing the dry end face of the plastic optical fiber against a third abrasive film with a third pressure, wherein the abrasive particles of the third abrasive film have a third mean particle size approximately equal to 1 micron;
(f) moving the third abrasive film relative to the dry end face of the plastic optical fiber for a third time duration while the dry end face is being pressed against the third abrasive film with the third pressure;
(g) pressing the dry end face of the plastic optical fiber against a fourth abrasive film with a fourth pressure, wherein the abrasive particles of the fourth abrasive film have a fourth mean particle size approximately equal to 0.3 micron; and
(h) moving the fourth abrasive film relative to the dry end face of the plastic optical fiber for a fourth time duration while the dry end face is being pressed against the fourth abrasive film with the fourth pressure.

15. The process as recited in claim 14, wherein a pressure of 1.5 pounds is applied during steps (a), (c), and (e), and a pressure of 0.5 pound is applied during step (g).

16. The process as recited in claim 14, wherein the abrasive particles of the second and third abrasive films are diamond particles, and the abrasive particles of the first and fourth abrasive films are aluminum oxide particles.

17. The process as recited in claim 14, wherein the first duration is six minutes, the second duration is six minutes, the third duration is four minutes, and the fourth duration is four minutes.

18. The process as recited in claim 14, wherein the plastic optical fiber is graded-index plastic optical fiber having a core and a cladding made of a transparent carbon-hydrogen bond-free perfluorinated polymer.

19. The process as recited in claim 14, wherein the plastic optical fiber has a data rate capability equal to at least 1 gigabit per second.

20. The process as recited in claim 14, further comprising installing the plastic optical fiber in an avionics network onboard an aircraft after step (h).

* * * * *